US012699508B1

(12) United States Patent
Brittner et al.

(10) Patent No.: US 12,699,508 B1
(45) Date of Patent: Aug. 4, 2026

(54) METHOD AND APPARATUS FOR ERASING A MEMORY DEVICE

(71) Applicant: Marvell Asia Pte Ltd, Singapore (SG)

(72) Inventors: Rod Brittner, San Jose, CA (US); Travis Roger Oenning, Rochester, MN (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/371,203

(22) Filed: Sep. 21, 2023

Related U.S. Application Data

(60) Provisional application No. 63/409,075, filed on Sep. 22, 2022.

(51) Int. Cl.
G06F 3/06 (2006.01)
(52) U.S. Cl.
CPC .......... G06F 3/0604 (2013.01); G06F 3/0619 (2013.01); G06F 3/0659 (2013.01); G06F 3/0679 (2013.01)
(58) Field of Classification Search
CPC .... G06F 3/0604; G06F 3/0619; G06F 3/0659; G06F 3/0679

USPC ................................................... 711/154, 100
See application file for complete search history.

(56) References Cited

U.S. PATENT DOCUMENTS

| | | | |
|---|---|---|---|
| 8,402,217 B2 | 3/2013 | Burd | |
| 8,645,656 B2 | 2/2014 | Yoon et al. | |
| 2013/0198451 A1* | 8/2013 | Hyun | G06F 3/0652 |
| | | | 711/155 |
| 2018/0232157 A1* | 8/2018 | Seo | G06F 3/0688 |
| 2020/0042549 A1 | 2/2020 | Mizrahi | |
| 2023/0195367 A1* | 6/2023 | Ji | G06F 3/0659 |
| | | | 711/154 |

* cited by examiner

*Primary Examiner* — Hosain T Alam
*Assistant Examiner* — Zubair Ahmed

(57) ABSTRACT

In response to receiving a read request while non-volatile memory is performing an erase operation, a solid state drive (SSD) device controller suspends the erase operation to permit the non-volatile memory to execute a read operation corresponding to the read request. The SSD device controller determines a time delay for suspending the erase operation based on a metric that indicates a degree of completeness of the erase operation, and delays suspending the erase operation for the determined time delay when the determined time delay is non-zero.

18 Claims, 9 Drawing Sheets

*Prior Art*

*FIG. 5*

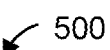 500

```
┌─────────────────────────────────────┐
│ Determine first metric that indicates│
│ percentage of completeness of erase  │
│ operation 504                        │
└─────────────────────────────────────┘
                  │
                  ▼
┌─────────────────────────────────────┐
│ Determine second metric that indicates│
│ percentage of maximum number of      │
│ suspend operations that were already │
│ performed during erase operation     │
│ 508                                  │
└─────────────────────────────────────┘
                  │
                  ▼
┌─────────────────────────────────────┐
│ Determine first comparison of the    │
│ first metric and the second metric 512│
└─────────────────────────────────────┘
                  │
                  ▼
             First
    No    Comparison >    Yes
        First Threshold?
             516
```

Determine second comparison of the first metric from the second metric 524

First operating mode 520

Second
No    Comparison >    Yes
Second Threshold?
528

End

Second operating mode 532

Figure 8:
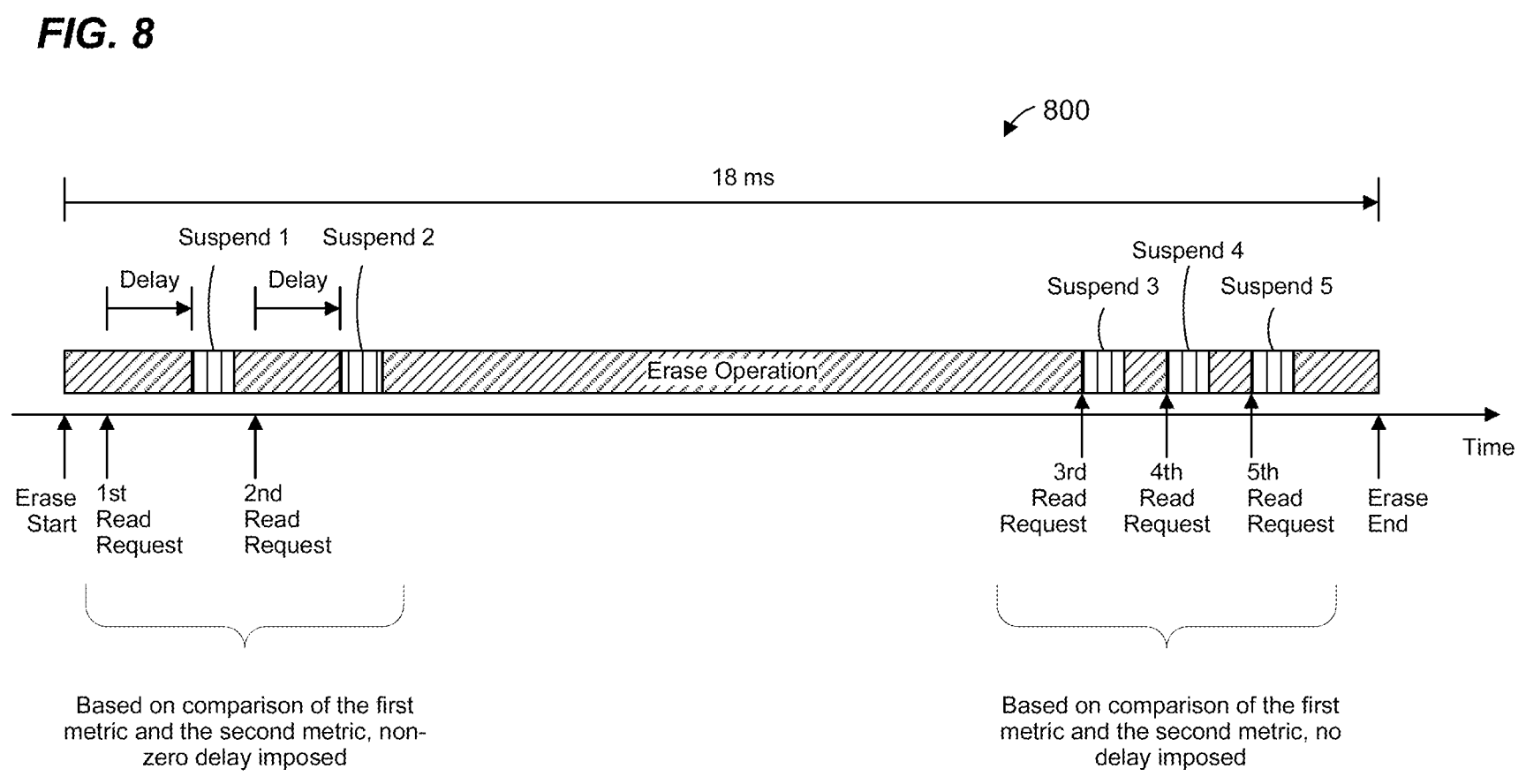

Time

Erase Operation

Erase Start

1st Read Request

Delay

Suspend 1

2nd Read Request

Delay

Suspend 2

Based on comparison of the first metric and the second metric, non-zero delay imposed 3rd Read Request Suspend 3

4th Read Request

Suspend 4

5th Read Request

Suspend 5

Erase End

Based on comparison of the first metric and the second metric, no delay imposed

Figure 9:
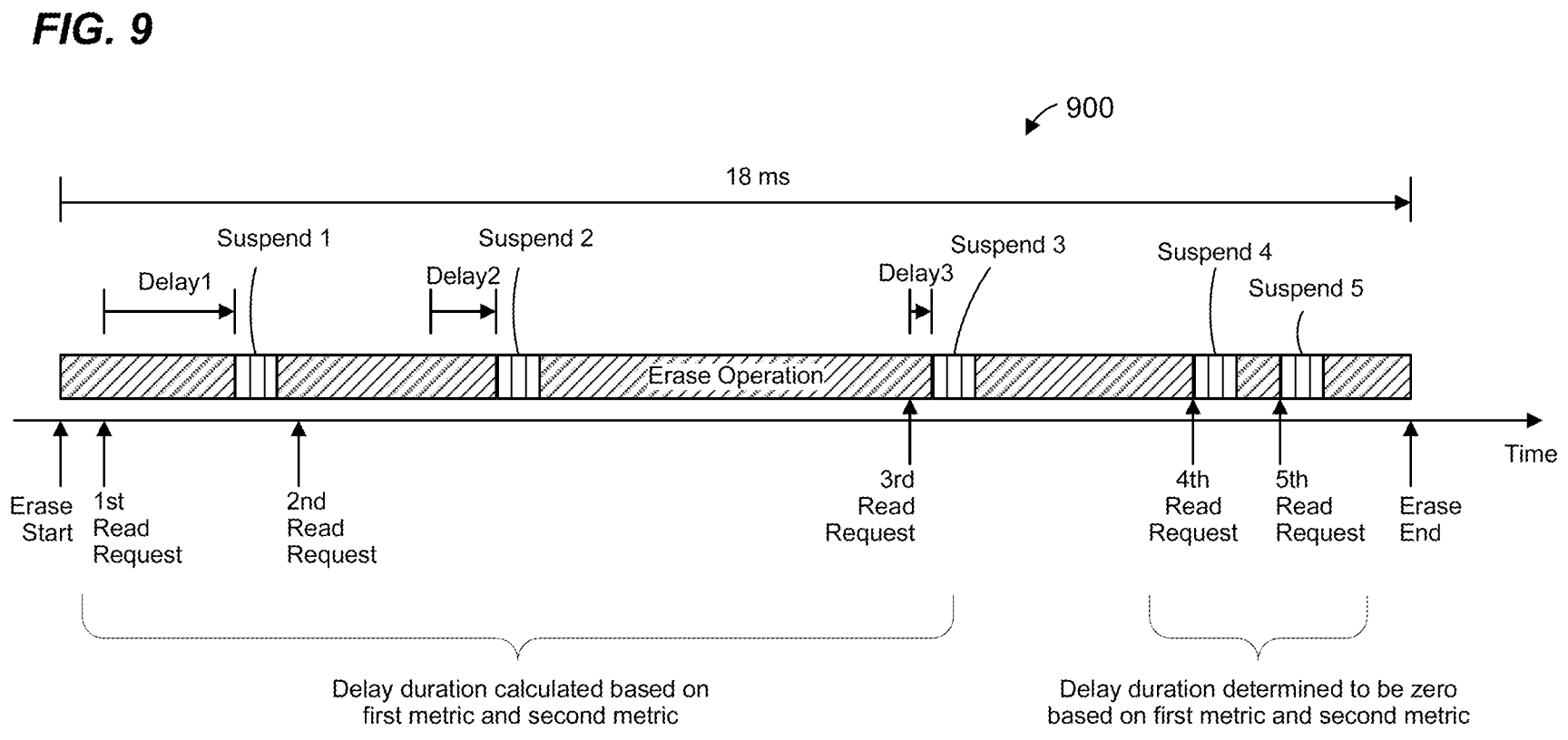

Time

Erase Start

1st Read Request

Suspend 1

Delay1

2nd Read Request

Suspend 2

Delay2

Erase Operation

3rd Read Request

Suspend 3

Delay3

4th Read Request

Suspend 4

5th Read Request

Suspend 5

Erase End

Delay duration calculated based on first metric and second metric

Delay duration determined to be zero based on first metric and second metric

FIG. 10

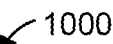

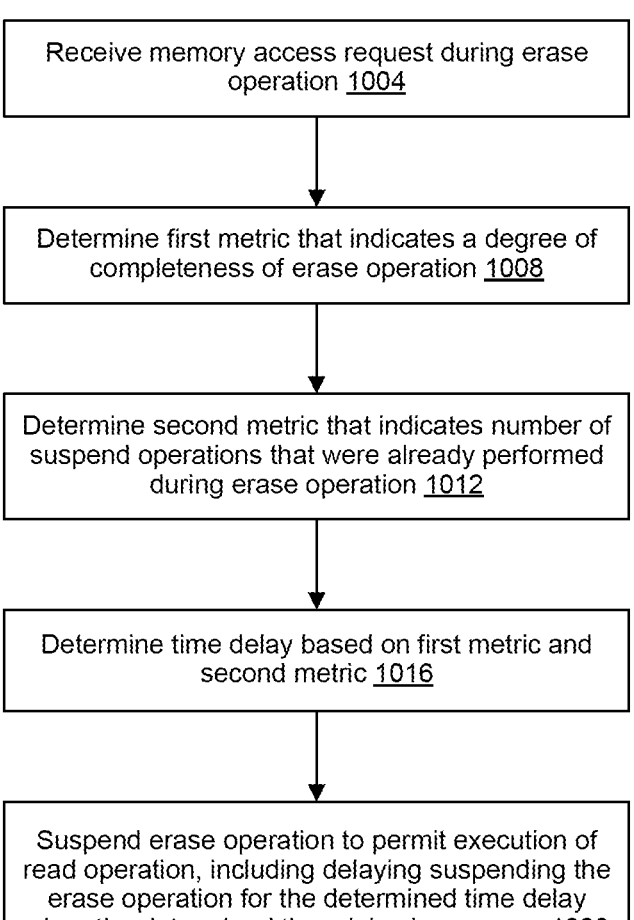

Receive memory access request during erase operation 1004

Determine first metric that indicates a degree of completeness of erase operation 1008

Determine second metric that indicates number of suspend operations that were already performed during erase operation 1012

Determine time delay based on first metric and second metric 1016

Suspend erase operation to permit execution of read operation, including delaying suspending the erase operation for the determined time delay when the determined time delay is non-zero 1020

METHOD AND APPARATUS FOR ERASING A MEMORY DEVICE

CROSS REFERENCES TO RELATED APPLICATIONS

This application claims the benefit of U.S. Provisional Patent App. No. 63/409,075, entitled "Trainable Erase Suspend Read Latency Avoidance," filed on Sep. 22, 2022, the disclosure of which is hereby expressly incorporated herein by reference in its entirety.

FIELD OF TECHNOLOGY

The present disclosure relates generally to non-volatile memory devices, and more particularly to techniques for performing memory access operations during erase operations on non-volatile memory devices.

BACKGROUND

A solid-state drive (SSD) is a data storage device that uses non-volatile memory such as NAND (Not-And) or NOR (Not-Or) non-volatile memory to store persistent digitally encoded data. With NAND SSDs, old data cannot be directly overwritten in its place. Rather, a section of the NAND SSD that includes old data must first be erased before new data can be written to the section.

A smallest unit of access of an SSD is referred to as a page. A typical size of a page is 16 kilobytes (kB). Pages are grouped into erase blocks, and a typical size of an erase block is tens of megabytes (MBs). An SSD integrated circuit (or "chip") typically includes many erase blocks. Read and write operations are performed at the page level. However, old data in a page cannot be overwritten. Rather, all data in an erase block that includes the page must first be erased before new data can be written to the page.

Initially, all erase blocks of an SSD are in an erased state and thus data can be written to the SSD easily. An SSD controller on the SSD uses a logical-to-physical mapping system known as logical block addressing (LBA) to map logical addresses of the SSD to physical addresses of the SSD. When a write request is received for a page of the SSD that already stores older data, the SSD controller will write the new data in a different page of the SSD and update the LBA to point to the new physical location. The data in the former location is no longer valid and thus is marked as "invalid". A page marked invalid will need to be erased before the SSD can write to that page again.

An erase operation is performed at the erase block level, i.e., each erase operation erases data in an entire erase block. An erase operation typically takes much longer than a read or write operation. As an example, reading or writing a page may take approximately on order of tens of microseconds (μs), whereas erasing an erase block may take 5-20 milliseconds (ms). When an erase operation is being performed on an erase block of an SSD chip, no read or write operations can be performed on any pages within any erase blocks of the SSD chip, i.e., the SSD chip is "busy".

A performance parameter that is important to many users of SSDs is referred to as quality of service (QoS), which typically specifies a maximum response time of the SSD with a certain confidence level, such as 99.9%, 99.99%, 99.999%, etc. As discussed above, an erase operation typically is longer than a read or write operation by multiple orders of magnitude. Because an erase operation can block memory access operations, such as read and write operations, from being performed (e.g., because the SSD chip is busy when performing an erase), erase operations can significantly impact QoS for memory access operations such as read and write operations.

FIG. 1 is a timing diagram of an example erase operation of a prior art NAND SSD. In the example of FIG. 1, the erase operation has a duration of 15 ms. At about 2 ms after the erase operation begins, the NAND SSD receives a read request corresponding to a NAND SSD chip that is performing the erase operation. Because the NAND SSD chip is "busy" with the erase operation, the NAND SSD cannot perform the read operation until the erase operation is completed, which results in an approximately 13 ms delay in beginning the read operation. Such a delay is multiple orders of magnitude greater than the duration of read operations of many SSDs and will significantly impact the QoS of read operations.

To mitigate delays caused by erase operations such as illustrated in FIG. 1, typical NAND SSDs are configured to temporarily suspend (or "pause") erase operations to permit a read operation to be performed before the erase operation is completed. FIG. 2 is a timing diagram of another example erase operation of a prior art NAND SSD that permits suspending of erase operations. In the example of FIG. 2, an erase operation without any suspending has a duration of 15 ms. Similar to the example of FIG. 1, at about 2 ms after the erase operation begins, the NAND SSD receives a read request corresponding to a NAND SSD chip that is performing the erase operation. In response to the received read request, a suspend command is issued to suspend the erase operation. After a delay resulting from an erase-to-suspend transition time, the erase operation is suspended, and the read operation commences. The delay between receiving the read request and beginning the read operation is significantly shorter than the delay illustrated in FIG. 1 because the read operation begins prior to the end of the erase operation. After the read operation is completed and after a suspend-to-erase transition time, the erase operation resumes.

In the example of FIG. 2, the suspending of the erase operation adds approximately 0.6 ms to the time between when the erase operation begins and when the erase operation ends.

In a typical NAND SSD, the number of times a single erase operation can be suspended is limited to a maximum number, which is specified by the NAND manufacturer. In some environments, such as in modern data centers with mixed read/write workloads, it is not uncommon for a NAND SSD to receive, during an erase operation, a number of memory access requests (e.g., read and/or write requests) that exceeds the maximum number of times the NAND SSD can be suspended. FIG. 3 is a timing diagram of another example erase operation of a prior art SSD that permits suspending of erase operations. As in FIGS. 1 and 2, an erase operation without any suspending has a duration of 15 ms in the example of FIG. 3. Additionally, the number of times a single erase operation can be suspended is limited to at most five suspends in the example of FIG. 3.

After the erase operation begins, the SSD receives five read requests spaced apart in time and thus the erase operation is suspended five different times. In the example of FIG. 3, the suspending of the erase operation adds approximately 3 ms to the time between when the erase operation begins and when the erase operation ends.

Subsequent to the five suspends and prior to the end of the erase operation, the SSD receives a sixth read request, which is not uncommon in some environments as discussed above. Because the erase operation has already been suspended five times (the maximum), the erase operation cannot be sus-
pended again. Because the SSD chip is "busy" with the erase
operation and the erase operation cannot be suspended
again, the SSD cannot perform the sixth read operation until
the erase operation is completed, which results in a delay of
greater than 15 ms in beginning the sixth read operation.
Thus, the delay experienced by the sixth read operation in
the example of FIG. 3 is even greater than the delay
experienced in the example of FIG. 1. Such a delay is
multiple orders of magnitude greater than the duration of the
read operation and will significantly impact the QoS of read
operations of the NAND SSD device.

SUMMARY

In an embodiment, a solid state drive (SSD) device
comprises non-volatile memory; and an SSD device con-
troller coupled to the non-volatile memory. The SSD device
controller is configured to, in response to receiving a read
request while the non-volatile memory is performing an
erase operation: determine a time delay for suspending the
erase operation based on a metric that indicates a degree of
completeness of the erase operation; and suspend the erase
operation to permit the non-volatile memory to execute a
read operation corresponding to the read request, including
delaying suspending the erase operation for the determined
time delay when the determined time delay is non-zero.

In another embodiment, a method for performing memory
operations in an SSD device that comprises non-volatile
memory includes, in response to receiving a read request
while the non-volatile memory is performing an erase opera-
tion: determining a time delay for suspending the erase
operation based on a metric that indicates a degree of
completeness of the erase operation; and suspending the
erase operation to permit the non-volatile memory to
execute a read operation corresponding to the read request,
including delaying suspending the erase operation for the
determined time delay when the determined time delay is
non-zero.

BRIEF DESCRIPTION OF THE DRAWINGS

FIG. 5 is a flow diagram of an example method for
performing an erase operation by an SSD device, according
to an embodiment.

FIG. 6 is a timing diagram of example memory operations
of an SSD device such as the SSD device of FIG. 4,
according to an embodiment.

FIG. 8 is a timing diagram of example memory operations
of an SSD device such as the SSD device of FIG. 4,
according to another embodiment.

FIG. 8 is a timing diagram of example memory operations
of an SSD device such as the SSD device of FIG. 4,
according to another embodiment.

FIG. 9 is a timing diagram of example memory operations
of an SSD device such as the SSD device of FIG. 4,
according to another embodiment.

FIG. 10 is a flow diagram of another example method for
performing an erase operation by an SSD device, according
to another embodiment.

DETAILED DESCRIPTION

In embodiments described below, a solid state drive
(SSD) suspends an erase operation in response to the SSD
receiving a memory access request (e.g., a read request, a
write request, etc.) during the erase operation, at least in
some scenarios. In connection with suspending an erase
operation, the SSD determines a time delay for suspending
the erase operation, according to some embodiments. The
SSD determines the time delay based on a degree of com-
pleteness of the erase operation, according to some embodi-
ments. Additionally, the SSD delays suspending the erase
operation for the determined time delay when the deter-
mined time delay is non-zero, according to some embodi-
ments. By determining the time delay based on the degree of
completeness of the erase operation, average memory access
latency is reduced and/or memory access quality of service
(QoS) is improved as compared to prior art SSDs, at least in
some embodiments. In some embodiments, the time delay is
minimum time delay that is measured from a previous
suspend operation, and when a time at which the memory
access request is received is already beyond the minimum
time delay.

Figure 4:
FIG. 4 is a diagram of an example SSD, according to an
embodiment.

FIG. 4 is a diagram of an example solid state drive (SSD)
400, according to an embodiment. The SSD 400 comprises
an SSD device controller 412 communicatively coupled to
one or more (a suitable integer K) NAND NVM dies
(sometimes referred to herein as "NVM chips" or "chips")
416. In an embodiment, the NVM chips 416 comprise one
or more NAND flash chips. In another embodiment, the
NVM chips 416 correspond to another suitable NVM tech-
nology other than NAND flash, e.g., phase-change memory
(PCM), a ferrorelectric random-access memory (FRAM), a
magnetoresistive random-access memory (MRAM), etc.

The SSD device controller 412 comprises an NVM con-
troller 420 that is configured to write data to and read data
from the NVM chips 416, according to an embodiment. The
NVM controller 420 is also configured to perform erase
operations regarding the NVM chips 416. For example, the
NVM controller 420 includes an erase/suspend controller
422 that is configured to control erase operations and
suspending of erase operations as will be described further
below.

The NVM controller 420 generally is configured to oper-
ate in accordance with non-volatile memory technology of
the NVM chips 416. For example, the NVM controller 420
comprises a NAND flash controller when the NVM chips
416 comprise one or more NAND flash chips, according to
an embodiment. The NVM controller 420 comprises another
suitable type of NVM controller (e.g., a PCM controller, an
FRAM controller, an MRAM controller, etc.) when the
NVM chips 416 comprise one or more suitable NVM chips
other than NAND flash chips (e.g., one or more PCM chips,
one or more FRAM chips, one or more MRAM chips, etc.),
according to another embodiment.

Figures 1, 2:
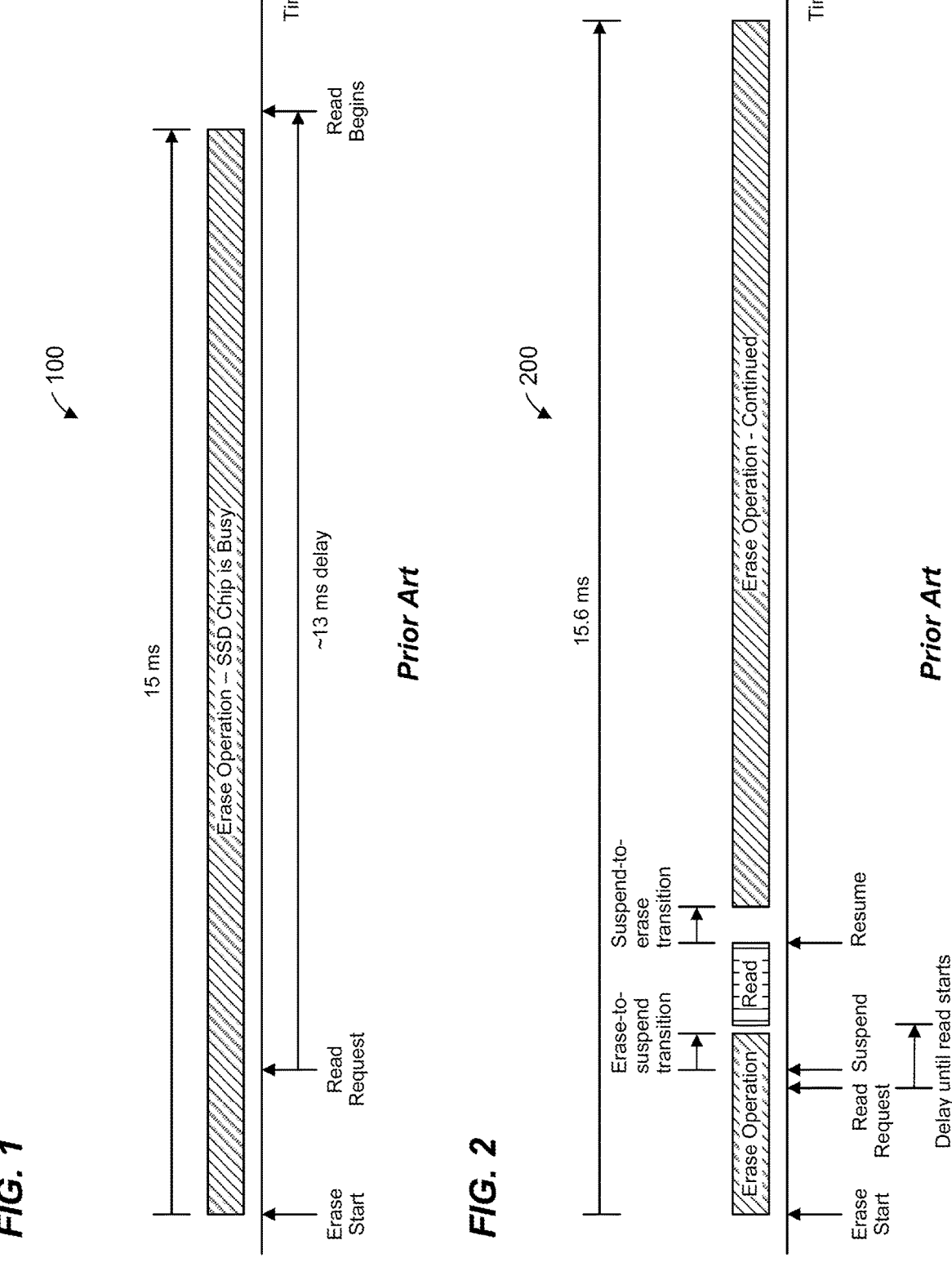
FIG. 1 is a timing diagram of an example erase operation
of a prior art solid state drive (SSD).
FIG. 2 is a timing diagram of another example erase
operation of a prior art SSD that permits suspending of erase
operations.
Figure 3:
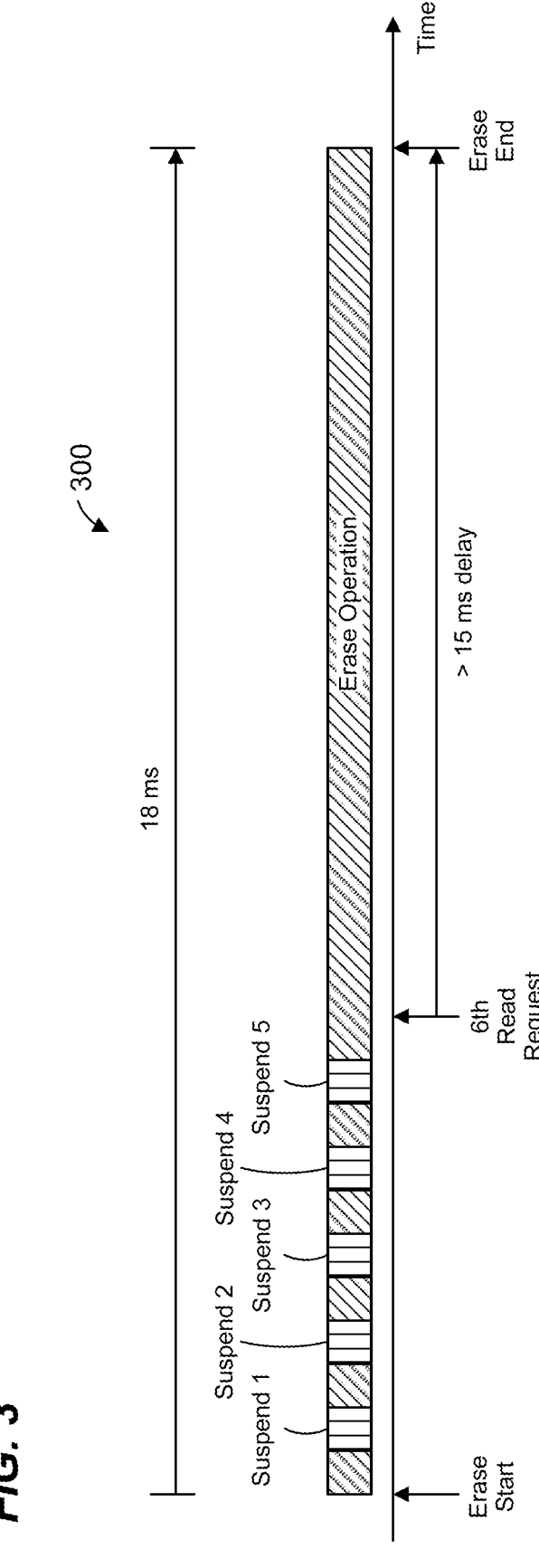
FIG. 3 is a timing diagram of another example erase
operation of a prior art SSD that permits suspending of erase
operations.

Each NVM chip 416 comprises a plurality of erase blocks
424 of storage (sometimes referred to herein as "blocks" for
brevity). Although FIG. 1 illustrates the NVM chips 416
each including a same number (a suitable integer N) of
blocks 424, two or more of the NVM chips 416 include different numbers of blocks 424. In an embodiment, each block includes 512 kilobytes (kB) of storage. In other embodiments, each block 424 has a suitable size different than 512 kB. In some embodiments, all of the blocks 424 of the NVM chips 416 have a same size. In other embodiments, two or more of the NVM chips 416 have blocks 424 with different sizes.

Each block 424 includes a plurality of pages (not shown). As an example, pages have a size of 16 kB, whereas erase blocks 424 have a size of tens of megabytes (MBs), according to an embodiment. In other embodiments, each block 424 has another suitable size and/or each page has another suitable size. In some embodiments, all of the pages of the NVM chips 416 have a same size. In other embodiments, two or more of the NVM chips 416 have pages with different sizes.

Read and write operations regarding the NVM chips 416 are performed at a page level, according to some embodiments. In other embodiments, read operations are performed at a single page at a time, whereas write operations are performed multiple pages (e.g., three pages) at a time. A write operation is performed on a blank page(s), and therefore the NVM controller 420 erases a page(s) with old data prior to writing new data to the page(s), according to some embodiments.

The NVM controller 420 comprises a processor that executes machine readable instructions that cause the NVM controller 420 to perform functions such as described above, in some embodiments. The NVM controller 420 additionally or alternatively comprises hardware circuitry (e.g., one or more hardware state machines) configured to perform functions such as described above, in some other embodiments.

The SSD device controller 412 also comprises one or more central processing units (CPUs) 440 that are configured to perform functions such as one or more of i) wear leveling to distribute writes evenly across NVM erase blocks in the NVM chips 416, ii) garbage collection, iii) mapping host/switch side logical block addresses (LBAs) to physical addresses of the NVM chips 416, etc., according to various embodiments.

The SSD device controller 412 also comprises a system controller 452 that performs functions associated with general control of the SSD Device 400 and control of communications with a host computer, a PCIe switch, an NVMe switch, etc., via a communication interface 460, according to various embodiments. In an embodiment, the communication interface 460 corresponds to the peripheral component interface express (PCIe) standard, and the communication interface 460 is coupled to a PCIe bus. In other embodiments, the communication interface 460 comprises a suitable interface other than PCIe, such as Serial Advanced Technology Attachment (SATA), Serial Attached Small Computer System Interface (SAS), Ethernet, Fibre Channel, Universal Serial Bus (USB), open NAND flash interface (ONFI), Infiniband, RapidIO, compute express link (CXL), etc.

The system controller 452 includes a communication interface controller 464 that is configured to perform functions associated with the communication interface 460. For example, in embodiments in which the communication interface 460 corresponds to the PCIe standard, the communication interface controller 464 comprises a PCIe controller that is configured to control communications with the host, PCIe switch, etc., via the communication interface 460. In embodiments in which the communication interface 460 does not correspond to the PCIe standard, the communication interface controller 464 is configured to control communications via another suitable communication interface 460, such as SATA, SAS, Ethernet, Fibre Channel, USB, ONFI, Infiniband, RapidIO, CXL, etc.

In some embodiments in which the SSD device 400 communicates with the host, switch, etc., according to the NVMe standard, the system controller 452 also includes an NVMe controller 468 that is configured to control communications with the host, switch, etc., according to the NVMe standard. In embodiments, in which the SSD device 400 does not communicate with the host, switch, etc., according to the NVMe standard, the system controller 452 omits the NVMe controller 468.

The system controller 452 comprises one or more processors that execute machine readable instructions that cause the one or more processors to perform functions such as described above, in some embodiments. For example, in an embodiment, each of the communication interface controller 460 and the NVMe controller 464 comprises a respective processor. In another embodiment, the communication interface controller 460 and the NVMe controller 464 comprise a single processor. The system controller 452 additionally or alternatively comprises hardware circuitry (e.g., one or more hardware state machines) configured to perform functions such as described above, in some other embodiments.

The SSD device controller 412 also comprises a volatile memory 476 such as one or more SRAMs, one or more DRAMs, etc. The NVM controller 420, the one or more CPUs 440, and the system controller 452 are communicatively coupled to the volatile memory 476 via a suitable fabric 480. In some embodiments, the volatile memory 476 stores a cache (or buffer) that stores i) write data that that is to be written to the NVM chips 416 and that was transferred from the host, switch, etc., via the communication interface 460, and/or ii) read data that was read from the NVM chips 416 and is to be transferred to the host, switch, etc., via the communication interface 460.

In an embodiment, the system controller 452 includes direct memory access (DMA) circuitry (not shown) that is configured to i) transfer data from the volatile memory 476 to the host, switch, etc., via the interface 460, and ii) transfer data from the host, switch, etc., to the volatile memory 476 via the interface 460. In other embodiments, the SSD device 400 does not include DMA circuitry such as described above.

Unlike read and write operations, erase operations are performed at an erase block level, according to some embodiments. When an erase operation is being performed on an erase block 424 of an NVM chip 416, no read or write operations can be performed on any erase blocks 424 of the NVM chip 416, i.e., the NVM chip 416 is "busy", according to some embodiments. As compared to read and write operations, an erase operation is relatively long. As an illustrative example, reading or writing a page may take ten to several tens of microseconds (µs), whereas erasing a block 424 may take 5-20 milliseconds (ms), according to some embodiments.

The NVM controller 420 (e.g., the erase/suspend controller 422) is configured to suspend an erase operation in response to the SSD device 400 receiving a memory access request (e.g., a read request, a write request, etc.) during the erase operation, at least in some scenarios. In connection with suspending an erase operation, the NVM controller 420 (e.g., the erase/suspend controller 422) is configured to determine a time delay for suspending the erase operation, as will be described in more detail below. The NVM controller 420 (e.g., the erase/suspend controller 422) is configured to determine the time delay based on a degree of completeness of the erase operation, according to some embodiments. The NVM controller 420 (e.g., the erase/suspend controller 422) is configured to determine the time delay also based on a number of suspend operations that were already performed during the erase operation, according to some embodiments. Additionally, the NVM controller 420 (e.g., the erase/suspend controller 422) is configured to delay suspending the erase operation for the determined time delay when the determined time delay is non-zero, according to some embodiments.

The erase/suspend controller 422 determines a first metric that indicates a degree of completeness of the erase operation. In an embodiment, the erase/suspend controller 422 includes a first counter that corresponds to the first metric, and the erase/suspend controller 422 increments the first counter as the erase operation proceeds so that the first counter indicates a degree of completeness of the erase operation. For example, the erase/suspend controller 422 begins the first counter at zero when the erase operation starts and increments the first counter at a suitable rate (and pauses the first counter during suspend operations) so that the first counter reaches a maximum value when the erase operation is complete, according to an embodiment.

In another embodiment, the erase/suspend controller 422 includes a timer that corresponds to the first metric, and the erase/suspend controller 422 starts the timer at zero when the erase operation begins and runs the timer as the erase operation proceeds (and pauses the timer during suspend operations) so that the timer indicates a degree of completeness of the erase operation. For example, the timer reaching a first value that corresponds to ¼ of an amount of time required to perform the erase operation indicates the erase operation is ¼ complete; the timer reaching a second value that corresponds to ½ of the amount of time required to perform the erase operation indicates the erase operation is ½ complete; the timer reaching a third value that corresponds to ¾ of the amount of time required to perform the erase operation indicates the erase operation is ¾ complete; etc.

In another embodiment, the timer is a countdown timer that begins at the amount of time required to perform the erase operation, and the erase/suspend controller 422 starts the countdown timer when the erase operation starts and runs the countdown timer as the erase operation proceeds (and pauses the timer during suspend operations) so that the timer indicates a degree of completeness of the erase operation. For example, the countdown timer reaching a first value that corresponds to ¾ of the amount of time required to perform the erase operation indicates the erase operation is ¼ complete; the countdown timer reaching a second value that corresponds to ½ of the amount of time required to perform the erase operation indicates the erase operation is ½ complete; the countdown timer reaching a third value that corresponds to ¼ of the amount of time required to perform the erase operation indicates the erase operation is ¾ complete; the countdown timer reaching zero indicates the erase operation is 100% complete etc.

The erase/suspend controller 422 also determines a second metric that indicates a number of suspend operations that were already performed during a current erase operation, according to some embodiments. In an embodiment, the erase/suspend controller 422 includes a second counter that corresponds to the second metric, and the erase/suspend controller 422 increments the second counter in connection with each suspend operation that the erase/suspend controller 422 performs during the current erase operation. When the number of times a single erase operation can be suspended is limited to a maximum number of suspends, the value of the second counter indicates a percentage of suspend operations that were already performed during the erase operation with respect to the maximum number of suspend operations. For example, the erase/suspend controller 422 begins the second counter at zero when the erase operation starts and increments the second counter in connection with each suspend operation performed during the erase operation, according to an embodiment. In another embodiment, the erase/suspend controller 422 begins the second counter at a value that corresponds to the maximum number of suspend operations, and decrements the second counter in connection with each suspend operation performed during the erase operation so that the second counter reaches zero when no further suspend operations can be performed during the current erase operation.

In some embodiments, in connection with the NVM controller 420 receiving a memory access request (e.g., a read request, a write request, etc.) during an erase operation, the erase/suspend controller 422 uses the first metric and the second metric to determine a time delay for suspending the erase operation. In some embodiments, the erase/suspend controller 422 determines a comparison of the first metric and the second metric, and uses the comparison to determine a time delay for suspending the erase operation. After the time delay, the erase/suspend controller 422 initiates the suspend operation to allow the memory access request to be performed.

FIG. 5 is a flow diagram of an example method 500 for performing an erase operation by an SSD device, according to an embodiment. In one embodiment, the method 500 is implemented in the SSD device 400 of FIG. 4, and the method 500 is described with reference to FIG. 4 merely for explanatory purposes. In other embodiments, the method 500 is implemented in another suitable SSD device. Additionally, the SSD device 400 implements another suitable method for determining a time delay for performing a suspend operation, in other embodiments.

At block 504, the SSD device determines (e.g., the erase/suspend controller 422 determines) a first metric (sometimes referred to herein as "% E") that indicates a percentage of completeness of the erase operation. For example, the SSD device maintains (e.g., the erase/suspend controller 422 maintains) a first counter, such as described above, that indicates the percentage of completeness of the erase operation.

At block 508, the SSD device determines (e.g., the erase/suspend controller 422 determines) a second metric (sometimes referred to herein as "% S") that indicates a percentage of suspend operations that were already performed during the erase operation with respect to a maximum number of suspend operations that the SSD device is capable of performing during a single erase operation, for example. For example, the SSD device maintains (e.g., the erase/suspend controller 422 maintains) a second counter, such as described above, that indicates the percentage of the suspend operations that were already performed during erase operation.

At block 512, the SSD device determines (e.g., the erase/suspend controller 422 determines) a first comparison of % E and % S that is a measure of a degree of which % S is greater than % E. For example, the SSD device determines (e.g., the erase/suspend controller 422 determines) the first comparison as a subtraction of % E from % S. In other embodiments, the first comparison is determined in another suitable manner.

At block 516, the SSD device determines (e.g., the erase/suspend controller 422 determines) whether the first comparison is above a first threshold. In response to the SSD device determining (e.g., the erase/suspend controller 422 determining) that the first comparison is above the first threshold, the flow proceeds to block 520. At block 520, the SSD device switches (e.g., the erase/suspend controller 422 switches) to a first operating mode (if the SSD device is not already in the first operating mode) in which the SSD device will delay (e.g., the erase/suspend controller 422 delays) starting a suspend operation until a non-zero minimum time duration has elapsed from a previous suspend operation, i.e., the SSD device imposes (e.g., the erase/suspend controller 422 imposes) a non-zero minimum time delay between a current suspend operation and a previous suspend operation. In the first operating mode, if a memory request (e.g., a read request) is received after the non-zero minimum time delay has already elapsed from the previous suspend operation, the SSD device does not impose a further delay, according to an embodiment.

In some embodiments, different non-zero minimum time delays are used depending on the total duration of the erase operation. For example, relatively smaller non-zero minimum time delays are used when the erase operation is relatively short, whereas relatively larger non-zero minimum time delays are used when the erase operation is relatively long.

On the other hand, in response to the SSD device determining (e.g., the erase/suspend controller 422 determining) at block 516 that the first comparison is not above the first threshold, the flow proceeds to block 524. At block 524, the SSD device determines (e.g., the erase/suspend controller 422 determines) a second comparison of % E and % S that is a measure of a degree of which % E is greater than % S. For example, the SSD device determines (e.g., the erase/suspend controller 422 determines) the second comparison as a subtraction of % S from % E. In other embodiments, the second comparison is determined in another suitable manner.

At block 528, the SSD device determines (e.g., the erase/suspend controller 422 determines) whether the second comparison is above a second threshold. In some embodiments, the second threshold is equal to the first threshold. In other embodiments, the second threshold is different than the first threshold. In response to the SSD device determining (e.g., the erase/suspend controller 422 determining) that the second comparison is above the second threshold, the flow proceeds to block 532. At block 532, the SSD device switches (e.g., the erase/suspend controller 422 switches) to a second operating mode (if the SSD device is not already in the second operating mode) in which the SSD device will start a suspend operation regardless of when a previous suspend operation was performed during the same erase operation. For example, in the second operating mode, in response to receiving a memory request (e.g., a read request), the SSD device starts a suspend operation regardless of when a previous suspend operation was performed during the same erase operation, according to an embodiment. In an embodiment, the second operation mode corresponds to the SSD device imposing (e.g., the erase/suspend controller 422 imposing) a minimum time delay between a current suspend operation and a previous suspend operation that is zero.

On the other hand, in response to the SSD device determining (e.g., the erase/suspend controller 422 determining) at block 528 that the second comparison is not above the second threshold, the flow ends.

In some embodiments, blocks 524 and/or 528 are performed prior to block 516. In some embodiments, the second comparison is not determined and block 524 is omitted. In some such embodiments, block 528 is modified to determine whether the first comparison is below a second threshold; the flow proceeds to block 532 when the first comparison is below the second threshold, and the flow ends when the first comparison is above the second threshold.

In some embodiments, blocks 524 and 528 are omitted; and in response to the SSD device determining (e.g., the erase/suspend controller 422 determining) at block 516 that the first comparison is not above the first threshold, the flow proceeds to block 532.

In some embodiments, blocks 508, 512, 524, and 528 are omitted; at block 516, the SSD device determines (e.g., the erase/suspend controller 422 determines) whether the first metric is below a threshold; in response to the SSD device determining (e.g., the erase/suspend controller 422 determining) that the first metric is below the threshold, the flow proceeds to block 520; and in response to the SSD device determining (e.g., the erase/suspend controller 422 determining) that the first metric is above the threshold, the flow proceeds to block 532.

In some embodiments, the method 500 is used for blocks 424 and/or chips 416 for which a duration of the erase operation is at least a first duration, whereas the method 500 is not used for blocks 424 and/or chips 416 for which the duration of the erase operation is below a second duration, i.e., no minimum time delay is imposed. In some embodiments, the first duration is equal to the second duration. In other embodiments, the first duration is greater than the second duration.

In some embodiments, different blocks 424 and/or chips 416 that utilize the method 500 use different minimum time delays. For example, blocks 424 and/or chips 416 that have relatively shorter erase durations use shorter minimum time delays as compared to blocks 424 and/or chips 416 that have relatively longer erase durations.

Figure 6:
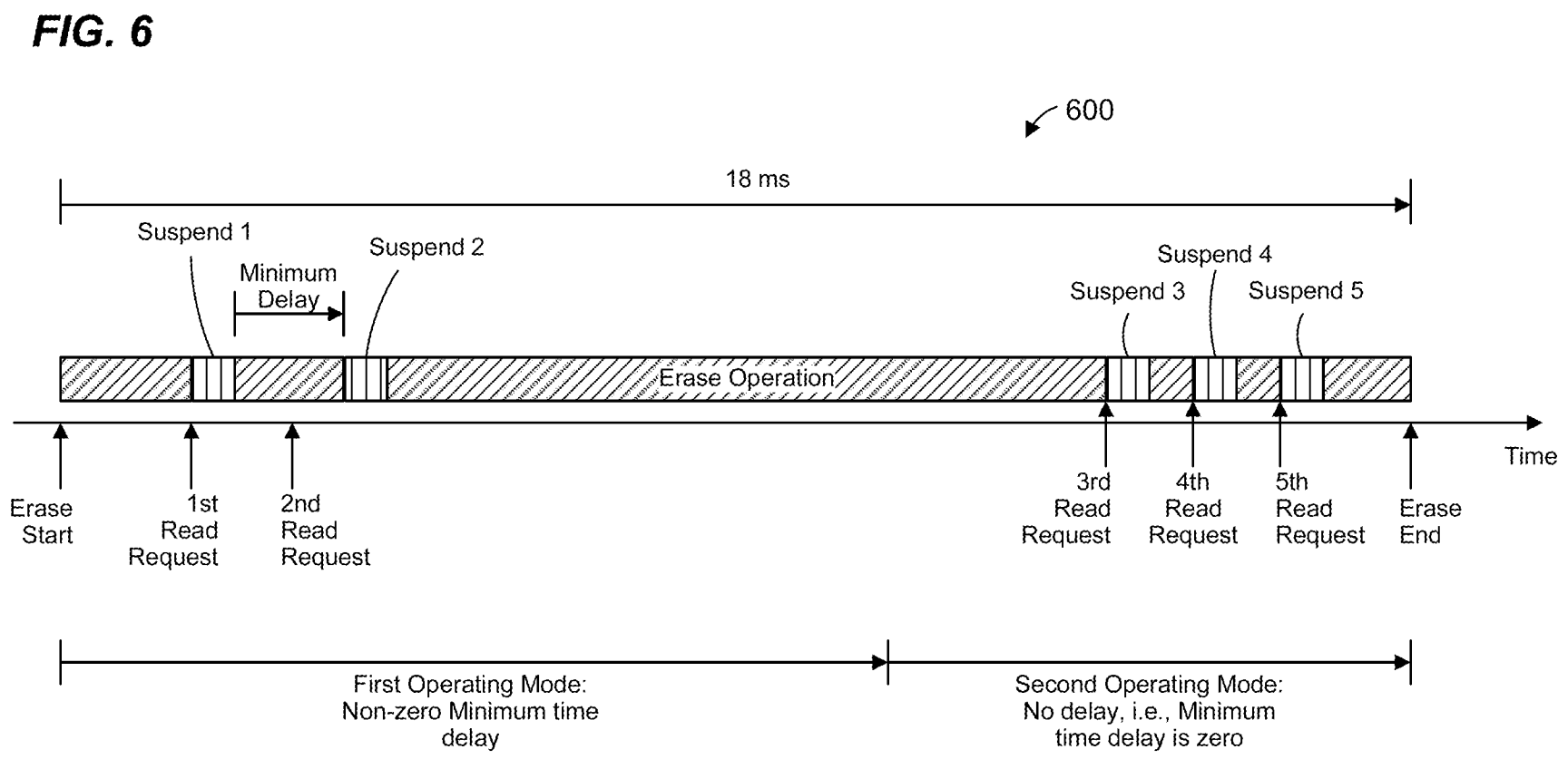

FIG. 6 is a timing diagram of example memory operations 600 of an SSD device such as the SSD device 400 of FIG. 4, according to an embodiment. The SSD device 400 performs the memory operations 600, according to an embodiment, and FIG. 6 is described with reference to FIG. 4 for explanatory purposes. In other embodiments, the memory operations 600 are performed by another suitable SSD device different than the SSD device 400. Additionally, the SSD device 400 performs other suitable memory operations different than the example memory operations 600 of FIG. 6, in some embodiments.

Additionally, the memory operations 600 are performed in conjunction with the method 500 of FIG. 5, and FIG. 6 is described with reference to FIG. 5 for explanatory purposes. In other embodiments, the memory operations 600 are performed in conjunction with a suitable method different than the method 500. Additionally, the method 500 is performed in conjunction with other suitable memory operations different than the example memory operations 600 of FIG. 6, in some embodiments.

In the example of FIG. 6, an erase operation without any suspends has a duration of 15 ms, merely as an illustrative example, but the duration of the erase operation is extended when suspends occur as will be described below. In other embodiments, an erase operation without any suspends has another suitable duration different than 15 ms. For example, erase operations (without any suspends) of typical SSD devices have durations of about 5 ms to 20 ms, although some SSDs have erase operation durations of less than 5 ms or greater than 20 ms. Additionally, the erase operation duration of an SSD may vary over time and/or use. For example, the erase operation duration may increase over time and/or use. Further, the respective erase operation durations of different erase blocks within an NVM chip and/or of different NVM chips may be the same or different, according to various embodiments. For example, if different NVM chips or different erase blocks within a single NVM chip are used with different frequencies, the respective erase operation durations of different NVM chips/erase blocks may differ over time, in some embodiments.

In the example of FIG. 6, the number of times a single erase operation can be suspended is limited to five (i.e., a maximum number of suspends), which is merely illustrative. In other embodiments, the maximum number of suspends is another suitable integer different than five, e.g., a greater than five or less than five.

When the erase operation begins, the SSD device is in the first operating mode discussed above with reference to FIG. 5. When a first read request is received, no time delay is imposed with regard to a corresponding first suspend operation even though the SSD device is in the first operating mode because there was not a previous suspend operation. On the other hand, when a second read request is received, a corresponding second suspend operation is delayed so that the second suspend operation begins the minimum time delay after the first suspend operation.

Subsequently, as no further read requests are received after the second read request, the SSD device switches to the second operating mode. While in the second operating mode, the SSD device receives a third read request, a fourth read request, and a fifth read request. Because the SSD device is in the second operating mode, no time delays are imposed with regard to corresponding third-fifth suspend operations.

Figure 7:
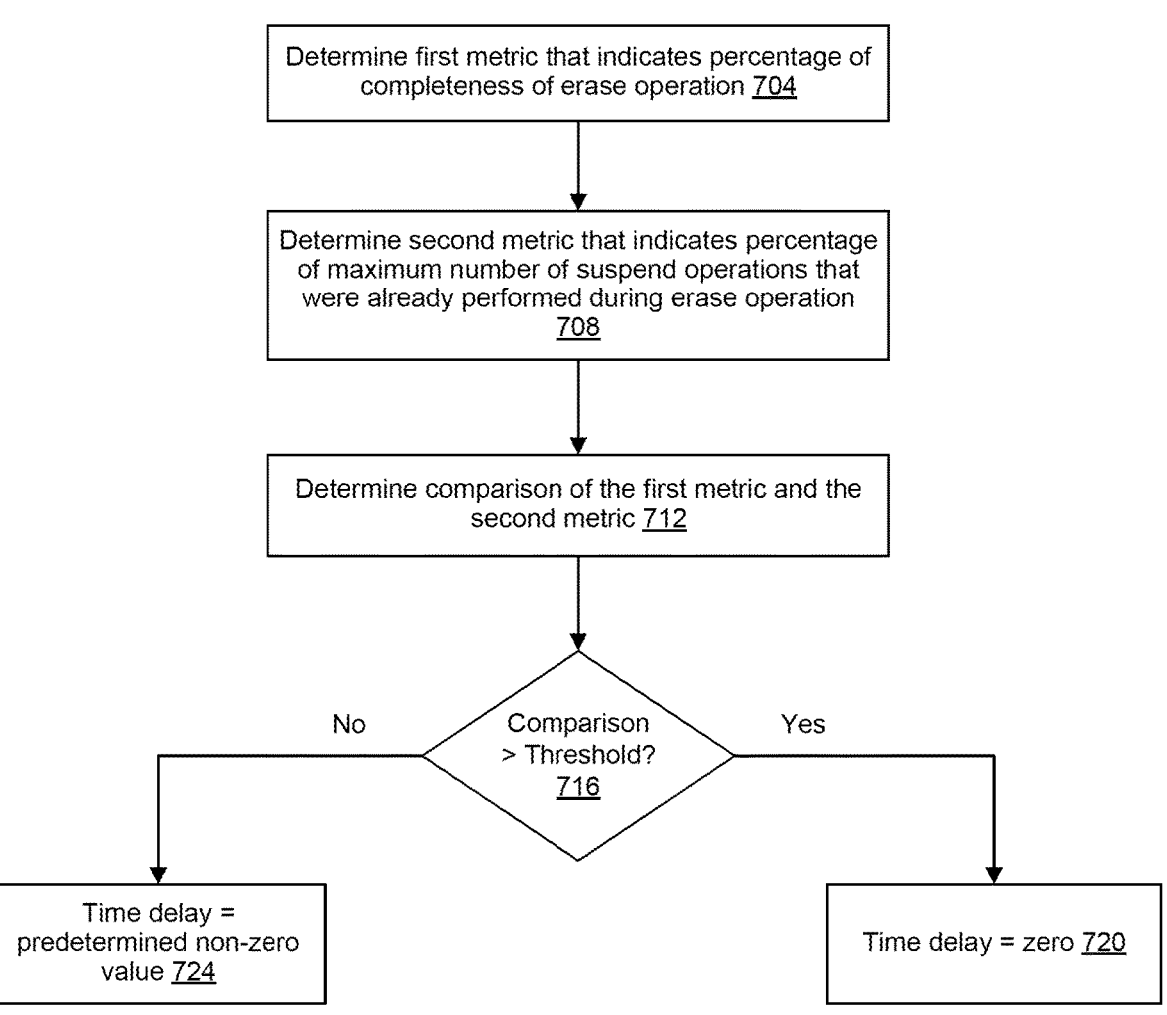
FIG. 7 is a flow diagram of another example method for
performing an erase operation by an SSD device, according
to another embodiment.

FIG. 7 is a flow diagram of another example method 700 for performing an erase operation by an SSD device, according to another embodiment. In one embodiment, the method 700 is implemented in the SSD device 400 of FIG. 4, and the method 700 is described with reference to FIG. 4 merely for explanatory purposes. In other embodiments, the method 700 is implemented in another suitable SSD device. Additionally, the SSD device 400 implements another suitable method for determining a time delay for performing a suspend operation, in other embodiments.

At block 704, the SSD device determines (e.g., the erase/suspend controller 422 determines) a first metric ("% E") that indicates a percentage of completeness of the erase operation. For example, the SSD device maintains (e.g., the erase/suspend controller 422 maintains) a first counter, such as described above, that indicates the percentage of completeness of the erase operation.

At block 708, the SSD device determines (e.g., the erase/suspend controller 422 determines) a second metric ("% S") that indicates a percentage of suspend operations that were already performed during the erase operation with respect to a maximum number of suspend operations that the SSD device is capable of performing during a single erase operation, for example. For example, the SSD device maintains (e.g., the erase/suspend controller 422 maintains) a second counter, such as described above, that indicates the percentage of the suspend operations that were already performed during erase operation.

At block 712, the SSD device determines (e.g., the erase/suspend controller 422 determines) a comparison of % E and % S that is a measure of a degree of which % E is greater than % S. For example, the SSD device determines (e.g., the erase/suspend controller 422 determines) the comparison as a subtraction of % S from % E. In other embodiments, the comparison is determined in another suitable manner.

At block 716, the SSD device determines (e.g., the erase/suspend controller 422 determines) whether the comparison is above a threshold. In an embodiment, block 716 is performed in connection with a memory access request (e.g., a read request) being received by the SSD device. In response to the SSD device determining (e.g., the erase/suspend controller 422 determining) that the comparison is above the threshold, the flow proceeds to block 720. At block 720, the SSD device determines (e.g., the erase/suspend controller 422 determines) that no delay will be imposed prior to starting the suspend operation that corresponds to the received memory access request. In other words, the SSD device determines (e.g., the erase/suspend controller 422 determines) that a zero-length delay will be imposed in connection with starting the suspend operation, in an embodiment.

On the other hand, in response to the SSD device determining (e.g., the erase/suspend controller 422 determining) at block 716 that the comparison is not above the threshold, the flow proceeds to block 724. At block 724, the SSD device determines (e.g., the erase/suspend controller 422 determines) that a non-zero time delay is to be imposed prior to starting a suspend operation that corresponds to the received memory access request. In some embodiments, different non-zero time delays are used depending on the total duration of the erase operation. For example, relatively smaller non-zero time delays are used when the erase operation is relatively short, whereas relatively larger non-zero time delays are used when the erase operation is relatively long.

In some embodiments, blocks 708 and 712 are omitted; at block 716, the SSD device determines (e.g., the erase/suspend controller 422 determines) whether the first metric is below a threshold; in response to the SSD device determining (e.g., the erase/suspend controller 422 determining) that the first metric is below the threshold, the flow proceeds to block 724; and in response to the SSD device determining (e.g., the erase/suspend controller 422 determining) that the first metric is above the threshold, the flow proceeds to block 720.

In some embodiments, the method 700 is used for blocks 424 and/or chips 416 for which a duration of the erase operation is at least a first duration, whereas the method 700 is not used for blocks 424 and/or chips 416 for which the duration of the erase operation is below a second duration, i.e., no delay is imposed. In some embodiments, the first duration is equal to the second duration. In other embodiments, the first duration is greater than the second duration.

In some embodiments, different blocks 424 and/or chips 416 that utilize the method 700 use different time delays. For example, blocks 424 and/or chips 416 that have relatively shorter erase durations use shorter time delays as compared to blocks 424 and/or chips 416 that have relatively longer erase durations.

FIG. 8 is a timing diagram of example memory operations 800 of an SSD device such as the SSD device 400 of FIG. 4, according to another embodiment. The SSD device 400 performs the memory operations 800, according to an embodiment, and FIG. 8 is described with reference to FIG. 4 for explanatory purposes. In other embodiments, the memory operations 800 are performed by another suitable SSD device different than the SSD device 400. Additionally, the SSD device 400 performs other suitable memory operations different than the example memory operations 800 of FIG. 8, in some embodiments.

Additionally, the memory operations 800 are performed in conjunction with the method 700 of FIG. 7, and FIG. 8 is described with reference to FIG. 7 for explanatory purposes. In other embodiments, the memory operations 800 are performed in conjunction with a suitable method different than the method 700. Additionally, the method 700 is performed in conjunction with other suitable memory operations different than the example memory operations 800 of FIG. 8, in some embodiments.

In the example of FIG. 8, an erase operation without any suspends has a duration of 15 ms, merely as an illustrative example, but the duration of the erase operation is extended when suspends occur as will be described below. In other embodiments, an erase operation without any suspends has another suitable duration different than 15 ms. For example, erase operations (without any suspends) of typical SSD devices have durations of about 5 ms to 20 ms, although some SSDs have erase operation durations of less than 5 ms or greater than 20 ms. Additionally, the erase operation duration of an SSD may vary over time and/or use. For example, the erase operation duration may increase over time and/or use. Further, the respective erase operation durations of different erase blocks within an NVM chip and/or of different NVM chips may be the same or different, according to various embodiments. For example, if different NVM chips or different erase blocks within a single NVM chip are used with different frequencies, the respective erase operation durations of different NVM chips/erase blocks may differ over time, in some embodiments.

In the example of FIG. 8, the number of times a single erase operation can be suspended is limited to five (i.e., a maximum number of suspends), which is merely illustrative. In other embodiments, the maximum number of suspends is another suitable integer different than five, e.g., a greater than five or less than five.

When a first read request is received, the comparison of the first metric and the second metric is below the threshold (block 716). Therefore, a non-zero time delay is imposed, and the beginning of the first suspend is delayed with respect to the first read request. Similarly, when a second read request is received, the comparison of the first metric and the second metric is below the threshold (block 716). Therefore, a non-zero time delay is imposed, and the beginning of the second suspend is delayed with respect to the second read request.

Subsequently, as no further read requests are received after the second read request, the comparison of the first metric and the second metric will eventually rise above the threshold (block 716). Thus, when third, fourth, and fifth read requests are received, the comparison of the first metric and the second metric is above the threshold (block 716). Therefore, no time delays are imposed in connection with third, fourth, and fifth suspend operations, i.e., the time delay is zero.

Embodiments described with reference to FIGS. 5-8 correspond to selecting a time delay from a set consisting of two values: zero and a predetermined non-zero value. In other embodiments, a time delay is selected from a set that includes multiple non-zero values based on i) a first metric that indicates a degree of completeness of the erase operation, and optionally ii) a second metric that indicates a number of suspend operations that were already performed during the erase operation.

FIG. 9 is a timing diagram of example memory operations 800 of an SSD device such as the SSD device 400 of FIG.

4, according to another embodiment. The SSD device 400 performs the memory operations 900, according to an embodiment, and FIG. 9 is described with reference to FIG. 4 for explanatory purposes. In other embodiments, the memory operations 900 are performed by another suitable SSD device different than the SSD device 400. Additionally, the SSD device 400 performs other suitable memory operations different than the example memory operations 800 of FIG. 9, in some embodiments.

In the example of FIG. 9, an erase operation without any suspends has a duration of 15 ms, merely as an illustrative example, but the duration of the erase operation is extended when suspends occur as will be described below. In other embodiments, an erase operation without any suspends has another suitable duration different than 15 ms. For example, erase operations (without any suspends) of typical SSD devices have durations of about 5 ms to 20 ms, although some SSDs have erase operation durations of less than 5 ms or greater than 20 ms. Additionally, the erase operation duration of an SSD may vary over time and/or use. For example, the erase operation duration may increase over time and/or use. Further, the respective erase operation durations of different erase blocks within an NVM chip and/or of different NVM chips may be the same or different, according to various embodiments. For example, if different NVM chips or different erase blocks within a single NVM chip are used with different frequencies, the respective erase operation durations of different NVM chips/erase blocks may differ over time, in some embodiments.

In the example of FIG. 9, the number of times a single erase operation can be suspended is limited to five (i.e., a maximum number of suspends), which is merely illustrative. In other embodiments, the maximum number of suspends is another suitable integer different than five, e.g., a greater than five or less than five.

When first, second, and third read requests are received, respective non-zero delays are determined for respective first, second, and third suspend operations based on i) a first metric that indicates a degree of completeness of the erase operation, and optionally ii) a second metric that indicates a number of suspend operations that were already performed during the erase operation. In the example of FIG. 9, the respective non-zero delays for the respective first, second, and third suspend operations are different. In some embodiments, the different delays are calculated using the first metric and optionally the second metric.

Later, when fourth and fifth read requests are received, respective delays for respective fourth and fifth suspend operations are determined to be zero based on the first metric and optionally the second metric.

FIG. 10 is a flow diagram of another example method 1000 for performing an erase operation by an SSD device, according to another embodiment. In one embodiment, the method 1000 is implemented in the SSD device 400 of FIG. 4, and the method 1000 is described with reference to FIG. 4 merely for explanatory purposes. In other embodiments, the method 1000 is implemented in another suitable SSD device. Additionally, the SSD device 400 implements another suitable method for determining a time delay for performing a suspend operation, in other embodiments.

At block 1004, the SSD device receives (e.g., the erase/suspend controller 422 receives) a memory access request (e.g., a read request, a write request, etc.) during an erase operation.

At block 1008, the SSD device determines (e.g., the erase/suspend controller 422 determines) a first metric that indicates a degree of completeness of the erase operation. In an embodiment, the first metric is the % E metric described above that indicates a percentage of completeness of the erase operation. In other embodiments, the first metric is another suitable metric that indicates the degree of completeness of the erase operation.

At block 1012, the SSD device determines (e.g., the erase/suspend controller 422 determines) a second metric that indicates that indicates a number of suspend operations that were already performed during the erase operation. In an embodiment, the second metric is the % S metric described above that indicates a percentage of suspend operations that were already performed during the erase operation with respect to a maximum number of suspend operations that the SSD device is capable of performing during a single erase operation, for example. In other embodiments, the second metric is another suitable metric that indicates the number of suspend operations that were already performed during the erase operation.

At block 1016, the SSD device determines (e.g., the erase/suspend controller 422 determines) a time delay for suspending the erase operation based on the first metric determined at block 1008 and the second metric determined at block 1012. In an embodiment, the time delay is determined at block 1016 based on a comparison of the first metric and the second metric. In an embodiment, the time delay is determined at block 1016 based on a comparison of a difference between the first metric and the second metric to a threshold. In an embodiment, determining the time delay comprises selecting, based on the first metric and the second metric, the time delay from a set of multiple time delay values that includes i) zero, and ii) a predetermined non-zero value. In some embodiments, different predetermined non-zero values are used depending on the total duration of the erase operation. For example, relatively smaller predetermined non-zero values are used when the erase operation is relatively short, whereas relatively larger predetermined non-zero values are used when the erase operation is relatively long.

In another embodiment, determining the time delay comprises calculating the time delay value using the first metric and the second metric.

At block 1016, the SSD device suspends (e.g., the erase/suspend controller 422 suspends) the erase operation to permit the non-volatile memory to execute a memory access operation corresponding to the memory access request received at block 1004, including delaying suspending the erase operation for the determined time delay when the determined time delay is non-zero. In some embodiments, the time delay is measured from a previous suspend operation. In other embodiments, the time delay is measured from the memory access request.

In some embodiments, block 1012 is omitted and the time delay is determined at block 1016 based on the first metric determined at block 1008.

In some embodiments, the method 1000 is used for blocks 424 and/or chips 416 for which a duration of the erase operation is at least a first duration, whereas the method 1000 is not used for blocks 424 and/or chips 416 for which the duration of the erase operation is below a second duration, i.e., no delay is imposed. In some embodiments, the first duration is equal to the second duration. In other embodiments, the first duration is greater than the second duration.

In some embodiments, different blocks 424 and/or chips 416 that utilize the method 1000 use different time delays. For example, blocks 424 and/or chips 416 that have relatively shorter erase durations use shorter time delays as compared to blocks 424 and/or chips 416 that have relatively longer erase durations.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A solid state drive (SSD) device, comprising:
non-volatile memory; and
an SSD device controller coupled to the non-volatile memory, the SSD device controller configured to:
operate in a first operating mode in which the SSD device controller begins suspending erase operations without delay,
operate in a second operating mode in which the SSD device controller delays starting the suspending of erase operations,
while performing an erase operation, calculate a parameter that corresponds to a comparison of i) a first metric that measures a degree of completeness of the erase operation relative to a total duration of the erase operation, and ii) a second metric that indicates a number of suspend operations that have already been performed during the erase operation,
perform a comparison of the parameter to a threshold,
determine whether to operate in the second operating mode using the comparison of the parameter to the threshold, and
in response to receiving a read request while the non-volatile memory is performing the erase operation,
suspend the erase operation to permit the non-volatile memory to execute a read operation corresponding to the read request, including delaying the start of suspending the erase operation for a time delay when operating in the second operating mode.

2. The SSD device of claim 1, wherein:
the first metric is a percentage of completion of the erase operation; and
the second metric is a percentage of suspend operations that were already performed during the erase operation with respect to a maximum number of suspend operations that the non-volatile memory is permitted to perform during each erase operation.

3. The SSD device of claim 2, wherein the SSD device controller is configured to:

calculate the parameter based on calculating a difference between the first metric and the second metric.

4. The SSD device of claim 1, wherein the SSD device controller is configured to:

when operating in the second operating mode, select, using the first metric and the second metric, a value of the time delay from a set of multiple time delay values that includes multiple predetermined non-zero values.

5. The SSD device of claim 1, wherein the SSD device controller is configured to:

when operating in the second operating mode, calculate a value of the time delay using the first metric and the second metric.

6. The SSD device of claim 1, wherein the SSD device controller is configured to:

when operating in the second operating mode, select, using the first metric that indicates the degree of completeness of the erase operation, a value of the time delay from a set of multiple time delay values that includes multiple predetermined non-zero values.

7. The SSD device of claim 1, wherein the SSD device controller is configured to:

when operating in the second operating mode, calculate a value of the time delay using the first metric that indicates the degree of completeness of the erase operation.

8. The SSD device of claim 1, wherein the comparison of the parameter to the threshold is a first comparison of the parameter to a first threshold, and wherein the SSD device controller is configured to:

perform the first comparison of the parameter to the first threshold while operating in the first operating mode;

determine whether to switch from the first operating mode to the second operating mode using the first comparison of the parameter to the first threshold;

perform a second comparison of the parameter to a second threshold while operating in the second operating mode; and determine whether to switch from the second operating mode to the first operating mode using the second comparison of the parameter to the second threshold.

9. The SSD device of claim 1, wherein the comparison of the parameter to the threshold is a first comparison of a first parameter to a first threshold, and wherein the SSD device controller is configured to:

while performing an erase operation, calculate a second parameter that corresponds to another comparison of i) the first metric, and ii) the second metric;

perform the first comparison of the first parameter to the first threshold while operating in the first operating mode;

determine whether to switch from the first operating mode to the second operating mode using the first comparison of the parameter to the first threshold;

perform a second comparison of the second parameter to a second threshold while operating in the second operating mode; and determine whether to switch from the second operating mode to the first operating mode using the second comparison of the second parameter to the second threshold.

10. A method for performing memory operations in a solid state drive (SSD) device that comprises non-volatile memory, the method comprising:

operating an SSD device controller of the SSD device in a first operating mode in which the SSD device controller begins suspending erase operations without delay;

operating the SSD device controller in a second operating mode in which the SSD device controller delays starting the suspending of erase operations;

while performing an erase operation, calculating, by the SSD device controller, a parameter that corresponds to a comparison of i) a first metric that measures a degree of completeness of the erase operation relative to a total duration of the erase operation, and ii) a second metric that indicates a number of suspend operations that have already been performed during the erase operation;

performing, by the SSD device controller, a comparison of the parameter to a threshold;

determining, by the SSD device controller, whether to operate in the second operating mode using the comparison of the parameter to the threshold; and in response to receiving a read request while the non-volatile memory is performing the erase operation, suspending the erase operation to permit the non-volatile memory to execute a read operation corresponding to the read request, including delaying the start of suspending the erase operation for a time delay when operating in the second operating mode.

11. The method of claim 10, wherein:

the first metric is a percentage of completion of the erase operation; and the second metric is a percentage of suspend operations that were already performed during the erase operation with respect to a maximum number of suspend operations that the non-volatile memory is permitted to perform during each erase operation.

12. The method of claim 11, wherein calculating the parameter comprises:

calculating the parameter based on calculating a difference between the first metric and the second metric.

13. The method of claim 10, further comprising, when operating in the second operating mode:

selecting, using the first metric and the second metric, a value of the time delay from a set of multiple time delay values that includes multiple predetermined non-zero values.

14. The method of claim 10, further comprising, when operating in the second operating mode:

calculating a value of the time delay using the first metric and the second metric.

15. The method of claim 10, further comprising, when operating in the second operating mode:

selecting, using the first metric that indicates the degree of completeness of the erase operation, a value of the time delay from a set of multiple time delay values that includes multiple predetermined non-zero values.

16. The method of claim 10, further comprising, when operating in the second operating mode:

calculating the value of the time delay using the first metric that indicates the degree of completeness of the erase operation.

17. The method of claim 10, wherein the comparison of the parameter to the threshold is a first comparison of the parameter to a first threshold, and wherein the method further comprises:

performing the first comparison of the parameter to the first threshold while operating in the first operating mode;

determining, at the SSD device controller, whether to switch from the first operating mode to the second operating mode using the first comparison of the parameter to the first threshold;

performing, at the SSD device controller, a second comparison of the parameter to a second threshold while operating in the second operating mode; and determining, at the SSD device controller, whether to switch from the second operating mode to the first operating mode using the second comparison of the parameter to the second threshold.

18. The method of claim 10, wherein the comparison of the parameter to the threshold is a first comparison of a first parameter to a first threshold, and wherein the SSD device controller is configured to:

while performing an erase operation, calculating, at the SSD device controller, a second parameter that corresponds to another comparison of i) the first metric, and ii) the second metric;

performing the first comparison of the first parameter to the first threshold while operating in the first operating mode;

determining, at the SSD device controller, whether to switch from the first operating mode to the second operating mode using the first comparison of the parameter to the first threshold;

performing, at the SSD device controller, a second comparison of the second parameter to a second threshold while operating in the second operating mode; and determining, at the SSD device controller, whether to switch from the second operating mode to the first operating mode using the second comparison of the second parameter to the second threshold.

\* \* \* \* \*